(12) United States Patent
Taniguchi

(10) Patent No.: US 6,517,693 B2
(45) Date of Patent: Feb. 11, 2003

(54) ION CONDUCTOR

(75) Inventor: Noboru Taniguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 85 days.

(21) Appl. No.: 09/778,592

(22) Filed: Feb. 7, 2001

(65) Prior Publication Data

US 2001/0018989 A1 Sep. 6, 2001

(30) Foreign Application Priority Data

Feb. 14, 2000 (JP) .......................... 2000-035266

(51) Int. Cl.⁷ ............................................. G01N 27/26
(52) U.S. Cl. .................... 204/421; 204/295; 429/30; 429/33; 501/103; 501/104; 501/123; 501/126; 501/135; 501/152
(58) Field of Search ................ 204/421, 295; 429/30, 33; 501/103, 104, 152, 123, 126, 135

(56) References Cited

U.S. PATENT DOCUMENTS

| | | | |
|---|---|---|---|
| 5,387,330 A | 2/1995 | Taniguchi et al. | 204/421 |
| 6,235,417 B1 * | 5/2001 | Wachsman et al. | 252/514 |
| 6,332,964 B1 * | 12/2001 | Chen et al. | 204/295 |

FOREIGN PATENT DOCUMENTS

| | | |
|---|---|---|
| EP | 1 029 837 | 2/2000 |
| JP | 6-231611 | 8/1994 |
| JP | 8-327592 | 12/1996 |
| JP | 9-295866 | 11/1997 |
| JP | 2882104 | 2/1999 |

OTHER PUBLICATIONS

Jose et al., 1997, *J. Mater. Res.*, 12:2976–2980, REBa₂ZrO₅.₅ (RE×La, Ce,Eu, and Yb):Synthesis, characterization, and their potential use as substrates for YBa₂Cu₃O₇₋δ superconducto.

Wienströer et al., 1997, *Solid State Ionics*, 101–103:113–1117, "Investigation of the influence of zirconium substitution on the properties of neodymium–doped barium cerates".

* cited by examiner

Primary Examiner—Bruce F. Bell
(74) Attorney, Agent, or Firm—Merchant & Gould P.C.

(57) ABSTRACT

The invention presents an ion conductor with high reliability, that is one of the following perovskite oxides: ① perovskite oxide of the composition $BaZr_{1-x}Ce_xO_{3-p}$ (0<x<0.8); ② perovskite oxide consisting essentially of Ba, Zr, Ce and O, and substantially conducting protons only; ③ perovskite oxide of the composition $BaZr_{1-x-y}Ce_xM_yO_{3-p}$ (M, $0 \leq x < 1, 0 < y < 1$, x+y<1) that is a single-phase polycrystal of cubic, tetragonal or orthorhombic crystal structure whose unit cell edges a, b and c (with $a \geq b \geq c$) satisfy 0.8386 nm<a<0.8916 nm and b/a≧0.90; ④ perovskite oxide of the same composition as in ③ that is a single-phase sintered product with a density of at least 96% of the theoretical density; and ⑤ perovskite oxide of the same composition as in ③ that is a single-phase sintered product with 1 to 30 μm granular diameter.

20 Claims, 3 Drawing Sheets

ION CONDUCTOR

BACKGROUND OF THE INVENTION

1. Field of the Invention

The present invention relates to an ion conductor suitable for electrochemical devices, such as fuel cells or sensors.

2. Description of the Related Art

Over the long history of ion conductors, a variety of ion conductors have been developed. In particular, examples of ion conductors for electrochemical devices, such as fuel cells or gas sensors, include zirconia and cerium oxides, which are solid oxide ion conductors. On the other hand, for example $SrCe_{1-x}M_xO_3$, $CaZr_{1-x}M_xO_3$, and $SrZr_{1-x}M_xO_3$ (wherein M is a trivalent element, and $0<x<1$; this is the same in all of the following formulae unless noted otherwise) are known as proton conductors. It also has been reported that oxides of barium and cerium ($BaCe_{1-x}M_xO_3$) are mixed ion conductors, in which both oxide ions and protons are conducted simultaneously.

Thus, many ion conductors have been found, but only few have made it into practical use. At present there are only zirconia, used for oxygen sensors, and $SrCe_{1-x}M_xO_3$, $CaZr_{1-x}M_xO_3$, etc. used for the detection of the hydrogen density in melting furnaces. And in these ion conductors, there are limitations to the environment in which they can be used, and their reliability is insufficient. For example, these ion conductors resolve within 1 to 100 hours in boiling water. This is the same for the mixed ion conductor $BaCe_{1-x}M_xO_3$. Among the conventionally known proton conductors of perovskite oxides, there is almost none that is stable in boiling water. Conventionally, stability in boiling water has not been considered for ion conductors of perovskite oxides.

Furthermore, ion conductors of solid oxides often are used at high temperatures, so that a high resistance against thermal shock is required. However, in the conventional ion conductors of perovskite oxides, the mechanical strength is not sufficient, and often cracks develop due to thermal shock.

Thus, it can be seen that ion conductors, and especially proton conductors of perovskite oxides, with high reliability are rare. However, as the development of electrochemical devices such as fuel cells proceeds, there is a strong demand for ion conductors with high reliability, that can be used under harsh environmental conditions.

SUMMARY OF THE INVENTION

It is therefore an object of the present invention to provide an ion conductor with high reliability and an electrochemical device using the same.

In order to achieve this object, an ion conductor in accordance with a first aspect of the present invention is a perovskite oxide having the composition $BaZr_{1-x}Ce_xO_{3-p}$, wherein x is larger than zero but not larger than 0.8, and p is larger than zero but smaller than 1.5.

An ion conductor in accordance with a second aspect of the present invention is a perovskite oxide essentially consisting of Ba, Zr, Ce and O, which substantially conducts protons only.

An ion conductor in accordance with a third aspect of the present invention is a perovskite oxide having the composition $BaZr_{1-x-y}Ce_xM_yO_{3-p}$, wherein M is a trivalent substituent element, x is at least zero but smaller than 1, y is larger than zero but smaller than 1, x+y is larger than zero but smaller than 1, and p is larger than zero (usually at least y/2) but smaller than 1.5, wherein the ion conductor is a substantially single-phase polycrystal of cubic, tetragonal or orthorhombic crystal system whose unit cell axes a, b and c (with $a \geq b \geq c$) satisfy $0.8386$ nm $< a < 0.8916$ nm and $b/a \geq 0.90$.

This ion conductor is a mixed ion conductor conducting protons and oxide ions (including oxygen ions). This ion conductor has an interatomic distance that is suitable for ion conduction, and a crystal structure that is physically and chemically stable. In this ion conductor, it is preferable that $b/a \geq 0.90$ and $c/a \geq 0.90$, because then its structure is close to that of a physically and chemically stable cubic system.

An ion conductor in accordance with a fourth aspect of the present invention is a perovskite oxide having the composition $BaZr_{1-x-y}Ce_xM_yO_{3-p}$, wherein M, x and y are as in the ion conductor of the third aspect, and wherein the ion conductor is a substantially single-phase sintered product whose density is at least 96% of the theoretical density.

Here, the theoretical density is the density calculated from the lattice constants.

An ion conductor in accordance with a fifth aspect of the present invention is a perovskite oxide having the composition $BaZr_{1-x-y}Ce_xM_yO_{3-p}$, wherein M, x and y are as in the ion conductor of the third aspect, and wherein the ion conductor is a substantially single-phase sintered product with a granular diameter of at least 1 $\mu$m and not more than 30 $\mu$m.

Here, the granular diameter is the particle diameter of the granules constituting the sintered product.

Resolution in boiling water and resolution due to thermal shock does not only vary with the interatomic bonding strength and crystallinity, but also depends on sintering. In the ion conductors according to the fourth and fifth aspect of the present invention, the density and the granular diameter of the sintered product are controlled in order to increase the reliability.

In the third to fifth ion conductors, it is both possible to include Ce (x>0) or not to include Ce (x=0), but M is essential (y>0).

It is preferable that the element M is at least one element selected from the group consisting of La, Pr, Nd, Pm, Sm, Eu, Gd, Tb, Dy, Ho, Er, Tm, Yb, Y, Sc, Mn, Fe, Co, Ni, Al, Ga and In. It is particularly preferable that M is at least one element selected from the group consisting of Gd, Yb, Y and In.

The present invention also presents an electrochemical device (for example, a fuel cell or a gas sensor) including any of the aforementioned ion conductors as the solid electrolyte.

DESCRIPTION OF THE PREFERRED EMBODIMENTS

Figure 1:
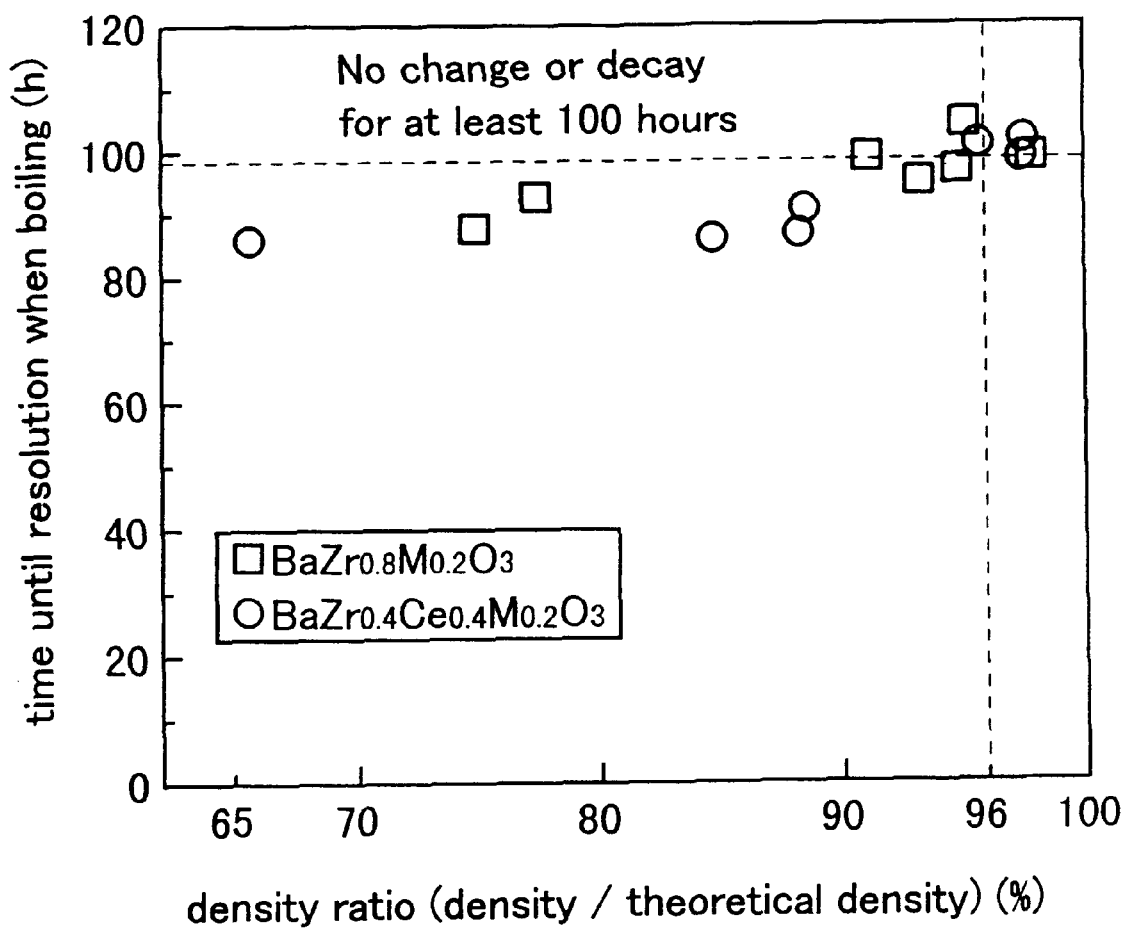
FIG. 1 is a diagram showing the time in boiling water until the sintered product resolves as a function of the density of sintered products in accordance with the present invention.

An ion conductor in accordance with the present invention in principle can be obtained with the methods that have come to be applied conventionally for the manufacture of perovskite oxide ion conductors. More specifically, methods that can be used include solid phase sintering, coprecipitation, nitration and spray granulation. Moreover, the oxide is not restricted to bulk forms, but also can be in the form of a film, and depending on this form, it is also possible to employ such manufacturing methods as CVD, sputtering and thermal spraying.

The following is a more detailed explanation of specific embodiments of ion conductors in accordance with the present invention. However, it should be noted that the ion conductors of the present invention are not limited to these embodiments.

First Embodiment

This embodiment relates to preferable embodiments of ion conductors in accordance with a first and second aspect of the present invention. The ion conductors of this embodiment include ion conductors that conduct substantially no oxide ions, but conduct only protons.

Ion conductors were synthesized by solid phase sintering (solid phase reaction). First, predetermined amounts of barium acetate, cerium oxide and zirconium hydroxide powders were weighed, and crushed and mixed in an agate mortar with ethanol solvent. After sufficient mixing, the solvent was evaporated, the mixture was heated with a burner for degreasing, and again crushed and mixed in the agate mortar. Then it was press-formed into a cylindrical shape and sintered for 10 h at 1300° C. The resulting sintered product was crushed coarsely, and then formed into pellets of about 3 μm by crushing with a planetary ball mill in a benzene solvent. After vacuum drying the resulting powder at 150° C., a sintered product was synthesized by forming a cylinder by hydrostatic pressing at 2000 kg/cm$^2$ and immediate sintering for 10 h at 1650° C.

The following seven compositions were synthesized:
1. $BaZr_{0.95}Ce_{0.05}O_{3-p}$,
2. $BaZr_{0.8}Ce_{0.2}O_{3-p}$,
3. $BaZr_{0.6}Ce_{0.4}O_{3-p}$,
4. $BaZr_{0.5}Ce_{0.5}O_{3-p}$,
5. $BaZr_{0.4}Ce_{0.6}O_{3-p}$,
6. $BaZr_{0.2}Ce_{0.8}O_{3-p}$, and
7. $BaZr_{0.15}Ce_{0.85}O_{3-p}$.

All of the resulting sintered products were sufficiently fine, and all were single-phase perovskite oxides.

In order to examine the conductivity of these sintered products, the sintered products were cut into disks and platinum electrodes were baked onto both sides. The conductivity of these sintered products with electrodes was measured at 750° C. in air, in nitrogen, and in a 3% hydrogen atmosphere. As a result, it was found that the sintered product made of Composition 7 ($BaZr_{0.15}Ce_{0.85}O_{3-p}$) is conductive in air and in the 3% hydrogen atmosphere. However, for the sintered products of the Compositions 1 to 6, conductivity only could be confirmed for the hydrogen atmosphere. Also, the larger the ratio cerium/zirconium (that is, the larger the number x), the larger is the conductivity in the hydrogen atmosphere. In this respect, it is preferable that x is at least 0.5.

Next, a hydrogen pump was assembled to verify whether the conductivity in the hydrogen atmosphere was in fact due to proton conduction. The anode side of the sintered products with electrodes was placed in a hydrogen atmosphere and the cathode side in an argon atmosphere, a voltage was applied between the two electrodes, and it was determined how much hydrogen was pumped out from the cathode. As a result, it was verified that hydrogen was pumped out at an efficiency of almost 100%. Consequently, the sintered products are all proton conductors.

Then, the conductivity of the sintered products with electrodes as part of an oxygen pump was measured. That is to say, when placing the anode in an oxygen atmosphere and the cathode in an argon atmosphere and applying a voltage, no oxide ions at all were pumped out from the anode in the sintered products of the Compositions 1 to 6. Thus, in these sintered products, only protons were conducted, and oxide ions were not conducted at all.

Ion conductors that conduct only protons were hitherto virtually unknown. Ion conductors that conduct only protons are particularly useful for electrochemical devices such as hydrocarbon sensors and hydrogen sensors.

Furthermore, the sintered products were put into boiling water of 100° C. to test their reliability. Conventional ion conductors (that is, ion conductors including barium, cerium and their substituent elements, ion conductors including strontium, cerium and their substituent elements, ion conductors including calcium, zirconium and their substituent elements; and ion conductors with the general formula: $CaZr_{0.9}In_{0.1}O_{3-p}$) all resolve in boiling water after ca. 1 h to 50 h, forming a precipitate. However, even after 100 h of boiling, no resolving or precipitation could be observed for any of the ion conductors made of the above sintered products. This result confirms that the first and second ion conductors of the present invention are materials with excellent reliability.

As mentioned above, it is preferable that the number x in the formula $BaZr_{1-x}Ce_xO_{3-p}$ is not larger than 0.8. When x is not larger than 0.8, then the reliability is increased. Considering conductivity, it is preferable that x is at least 0.2.

Second Embodiment

This embodiment relates to preferable embodiments of ion conductors in accordance with a third aspect of the present invention. The ion conductors of this embodiment have lattice constants within a predetermined range and are mixed ion conductors that conduct both oxide ions and protons.

Also in this embodiment, ion conductors were synthesized by solid phase sintering. First, predetermined amounts of powders of barium acetate, cerium oxide, zirconium hydroxide, and a predetermined substituent element were weighed, and crushed and mixed in an agate mortar with ethanol solvent. After sufficient mixing, the solvent was evaporated, the mixture was heated with a burner for degreasing, and further crushed in a ball mill to sufficiently mix and crush the raw materials. Then it was press-formed into a cylindrical shape and sintered for 10 h at 1300° C. The resulting sintered product was crushed coarsely, and then formed into pellets of about 3 μm by crushing with a planetary ball mill in a benzene solvent. After vacuum drying the resulting powder at 150° C., a sintered product was synthesized by forming a cylinder by hydrostatic pressing at 2000 kg/cm$^2$ and immediate sintering for 10 h at 1650° C.

All of the resulting sintered products were perovskite polycrystals of single-phase crystal and sufficiently fine. X-ray diffraction showed that all sintered products were cubic, tetragonal or orthorhombic. Also, the crystal lattice constants (unit cell axes) were examined for all sintered products, and it was determined whether the lattice constants a, b and c (determined so that $a \geq b \geq c$) satisfy 0.8386 nm<a<0.8916 nm and $b/a \geq 0.9$.

The stability of the resulting sintered products was examined with the change of the thermal expansion coefficient. That is to say the average thermal expansion coefficients from room temperature to 500° C. and the average thermal expansion coefficients from 500° C. to 1000° C. were determined, and sintered products in which the change over the latter range is less than 10% of the change over the former range were marked as stable (A), whereas sintered products where the change over the latter range is 10% or more than the change over the former range were marked as unstable (B). The thermal expansion coefficient varies widely when phase changes occur. In some sintered products marked as unstable, a large peak could be observed in differential thermal analysis.

Furthermore, the conductivity in air at 500° C. was measured, and sintered products whose conductivity exceeded $1 \times 10^{-3}$ S/cm were marked as good (A), whereas sintered products whose conductivity was less than $1 \times 10^{-3}$ S/cm were marked as poor (B).

Table 1 shows the determined lattice constants, stability and conductivity for the various compositions of the sintered products. For the lattice constants, a and b/a are marked as good (A) when they satisfied 0.8386 nm<a<0.8916 nm and b/a≧0.9 respectively, and the specific value is listed when these equations were not satisfied.

TABLE 1

| Composition | a | b/a | stability | conductivity |
|---|---|---|---|---|
| $BaZrO_{3-p}$ | 8.386 | 1 | A | B |
| $BaZr_{0.95}In_{0.05}O_{3-p}$ | A | A | A | A |
| $BaZr_{0.9}Mn_{0.1}O_{3-p}$ | A | A | A | A |
| $BaZr_{0.9}Y_{0.1}O_{3-p}$ | A | A | A | A |
| $BaZr_{0.8}In_{0.2}O_{3-p}$ | A | A | A | A |
| $BaZr_{0.8}Gd_{0.2}O_{3-p}$ | A | A | A | A |
| $BaZr_{0.8}La_{0.2}O_{3-p}$ | A | A | A | A |
| $BaZr_{0.9}Sm_{0.1}O_{3-p}$ | A | A | A | A |
| $BaZr_{0.8}Ga_{0.2}O_{3-p}$ | A | A | A | A |
| $BaZr_{0.05}Ce_{0.85}Sm_{0.1}O_{3-p}$ | 8.916 | A | B | A |
| $BaZr_{0.05}Ce_{0.75}In_{0.2}O_{3-p}$ | A | 0.81 | B | A |
| $BaZr_{0.1}Ce_{0.7}Mn_{0.2}O_{3-p}$ | A | 0.85 | B | A |
| $BaZr_{0.2}Ce_{0.6}In_{0.2}O_{3-p}$ | A | A | A | A |
| $BaZr_{0.3}Ce_{0.5}Dy_{0.2}O_{3-p}$ | A | A | A | A |
| $BaZr_{0.4}Ce_{0.4}Gd_{0.2}O_{3-p}$ | A | A | A | A |
| $BaZr_{0.4}Ce_{0.4}In_{0.2}O_{3-p}$ | A | A | A | A |
| $BaZr_{0.4}Ce_{0.4}Y_{0.2}O_{3-p}$ | A | A | A | A |
| $BaZr_{0.4}Ce_{0.4}Mn_{0.2}O_{3-p}$ | A | A | A | A |
| $BaZr_{0.5}Ce_{0.3}Nd_{0.2}O_{3-p}$ | A | A | A | A |
| $BaZr_{0.6}Ce_{0.3}Pr_{0.1}O_{3-p}$ | A | A | A | A |
| $BaZr_{0.7}Ce_{0.2}Yb_{0.1}O_{3-p}$ | A | A | A | A |
| $BaZr_{0.8}Ce_{0.1}Sc_{0.1}O_{3-p}$ | A | A | A | A |
| $BaZr_{0.85}Ce_{0.1}Eu_{0.05}O_{3-p}$ | A | A | A | A |

As shown in Table 1, when the lattice constants of the ion conductors represented by the above-noted formula satisfy the above-noted equation, then the ion conductor has high reliability and excellent conductivity.

Third Embodiment

This embodiment relates to preferable embodiments of ion conductors in accordance with a fourth aspect of the present invention. The ion conductors of this embodiment have the above-noted predetermined composition, a density of at least 96% of the theoretical density, and excellent moisture resistance and water resistance.

Also in this embodiment, the ion conductors were synthesized by solid phase sintering. First, predetermined amounts of powders of barium acetate, cerium oxide, zirconium hydroxide, and a predetermined substituent element were weighed, and crushed and mixed in an agate mortar with ethanol solvent. After sufficient mixing, the solvent was evaporated, the mixture was heated with a burner for degreasing, and further crushed in a ball mill to sufficiently mix and crush the raw materials. For the crushing with the ball mill, grinding balls of not more than 4 mm diameter (φ4 mm) were used. When such grinding balls are used, it is easy to obtain sintered products with high density (specifically, with a density of at least 96% of the theoretical density).

Then the mixture was press-formed into a cylindrical shape and sintered for 10 h at 1300° C. The resulting sintered product was crushed coarsely, and then formed into pellets of about 3 μm by crushing with a planetary ball mill in a benzene solvent. After vacuum drying the resulting powder at 150° C., a sintered product was synthesized by forming a cylinder by hydrostatic pressing at 2000 kg/cm² and immediate sintering for 10 h at 1650° C. The density of the resulting sintered products was in all cases at least 96% of the theoretical density.

On the other hand, sintered products of the same compositions were synthesized in the same manner, except that the crushing with a ball mill was omitted from the mixing and crushing of the raw materials before press forming. The density of the resulting sintered products was less than 96% of the theoretical density in all of those cases.

In this embodiment, the following 23 compositions were synthesized:
1. $BaZr_{0.8}Gd_{0.2}O_{3-p}$,
2. $BaZr_{0.8}Y_{0.2}O_{3-p}$,
3. $BaZr_{0.8}In_{0.2}O_{3-p}$,
4. $BaZr_{0.8}Mn_{0.2}O_{3-p}$,
5. $BaZr_{0.9}La_{0.1}O_{3-p}$,
6. $BaZr_{0.9}Sm_{0.1}O_{3-p}$,
7. $BaZr_{0.8}Ga_{0.2}O_{3-p}$,
8. $BaZr_{0.5}Ce_{0.4}Gd_{0.1}O_{3-p}$,
9. $BaZr_{0.5}Ce_{0.3}Nd_{0.2}O_{3-p}$,
10. $BaZr_{0.4}Ce_{0.4}Eu_{0.2}O_{3-p}$,
11. $BaZr_{0.6}Ce_{0.3}Pr_{0.1}O_{3-p}$,
12. $BaZr_{0.6}Ce_{0.3}Pm_{0.1}O_{3-p}$,
13. $BaZr_{0.7}Ce_{0.2}Tb_{0.1}O_{3-p}$,
14. $BaZr_{0.7}Ce_{0.2}Dy_{0.1}O_{3-p}$,
15. $BaZr_{0.8}Ce_{0.1}Ho_{0.1}O_{3-p}$,
16. $BaZr_{0.8}Ce_{0.1}Er_{0.1}O_{3-p}$,
17. $BaZr_{0.8}Ce_{0.1}Tm_{0.1}O_{3-p}$,
18. $BaZr_{0.6}Ce_{0.25}Yb_{0.15}O_{3-p}$,
19. $BaZr_{0.6}Ce_{0.25}Sc_{0.15}O_{3-p}$,
20. $BaZr_{0.5}Ce_{0.45}Fe_{0.05}O_{3-p}$,
21. $BaZr_{0.5}Ce_{0.45}Co_{0.05}O_{3-p}$,
22. $BaZr_{0.5}Ce_{0.45}Ni_{0.05}O_{3-p}$, and
23. $BaZr_{0.5}Ce_{0.45}Al_{0.05}O_{3-p}$.

These sintered products were put into boiling water of 100° C. to test whether the sintered products resolve. Even after leaving the sintered products with a density of at least 96% of the theoretical density for more than 100 h in boiling water, no resolving or precipitation could be observed. On the other hand, almost all sintered products with a density of less than 96% of the theoretical density resolved within 100 h, and precipitation could be observed. Also in a moisture-proof test at 85° C. and 85% relative humidity, the sintered products with a density of at least 96% of the theoretical density showed neither changes in the surface nor decay even after 3000 h, whereas in the sintered products with a density of less than 96% of the theoretical density, the surface turned white, and resolution could be observed.

FIG. 1 shows the boiling time until the sintered product resolves as a function of the density ratio (density/theoretical density) of the sintered products.

Thus it could be confirmed that sintered products of perovskite oxides with the composition $BaZr_{1-x}M_xO_{3-p}$ and perovskite oxides with the composition $BaZr_{1-x-y}Ce_xM_yO_{3-p}$ having a density of at least 96% of the theoretical density have excellent water resistance and moisture resistance, and high reliability.

Fourth Embodiment

This embodiment relates to preferable embodiments of ion conductors in accordance with a fifth aspect of the present invention. The ion conductors of this embodiment have the above-noted predetermined composition, and the above-noted predetermined granular diameter.

Also in this embodiment, the ion conductors were synthesized by solid phase sintering. First, predetermined amounts of powders of barium acetate, cerium oxide, zirconium hydroxide, and a predetermined substituent element were weighed, and crushed and mixed in an agate mortar with ethanol solvent. After sufficient mixing, the solvent was evaporated, the mixture was heated with a burner for degreasing, and further crushed in a ball mill to sufficiently mix and crush the raw materials. For the crushing with the ball mill, grinding balls of not more than 4 mm diameter ($\phi$4 mm) were used.

Then the mixture was press-formed into a cylindrical shape and sintered for 10 h at 1300° C. The resulting sintered product was crushed coarsely, and then formed into pellets of about 3 $\mu$m by crushing with a planetary ball mill in a benzene solvent. For the crushing with the ball mill, grinding balls of at least 10 mm diameter ($\phi$10 mm) were used. Using such grinding balls, it was easy to control the granular diameter. After vacuum drying the resulting powder at 150° C., a sintered product was synthesized by forming a cylinder by hydrostatic pressing at 2000 kg/cm$^2$ and immediate sintering for 10 h at 1650° C. The resulting sintered products were single-phase perovskite oxides, and the granular diameter was in all cases in the range of 1 $\mu$m to 30 $\mu$m.

On the other hand, sintered products of the same compositions were synthesized in the same manner, except that the sintering temperature after the hydrostatic pressing was set to 1675° C. or 1600° C. The sintered products sintered at 1675° C. were very fine, but due to the progress of the granular growth, at least 30% of the granules exceeded a granular diameter of 100 $\mu$m. On the other hand, the sintered products sintered at 1600° C. granules stayed condensed as before the sintering, and the resulting products were inadequate as sintered products.

In this embodiment, the following 23 compositions were synthesized:

1. $BaZr_{0.9}Gd_{0.1}O_{3-p}$,
2. $BaZr_{0.9}Y_{0.1}O_{3-p}$,
3. $BaZr_{0.9}In_{0.1}O_{3-p}$,
4. $BaZr_{0.9}Mn_{0.1}O_{3-p}$,
5. $BaZr_{0.95}La_{0.05}O_{3-p}$,
6. $BaZr_{0.95}Sm_{0.05}O_{3-p}$,
7. $BaZr_{0.9}Ga_{0.1}O_{3-p}$,
8. $BaZr_{0.4}Ce_{0.4}Gd_{0.2}O_{3-p}$,
9. $BaZr_{0.4}Ce_{0.4}Nd_{0.2}O_{3-p}$,
10. $BaZr_{0.5}Ce_{0.3}Eu_{0.2}O_{3-p}$,
11. $BaZr_{0.6}Ce_{0.2}Pr_{0.2}O_{3-p}$,
12. $BaZr_{0.6}Ce_{0.3}Pm_{0.1}O_{3-p}$,
13. $BaZr_{0.7}Ce_{0.2}Tb_{0.1}O_{3-p}$,
14. $BaZr_{0.7}Ce_{0.2}Dy_{0.1}O_{3-p}$,
15. $BaZr_{0.8}Ce_{0.1}Ho_{0.1}O_{3-p}$,
16. $BaZr_{0.8}Ce_{0.1}Er_{0.1}O_{3-p}$,
17. $BaZr_{0.8}Ce_{0.1}Tm_{0.1}O_{3-p}$,
18. $BaZr_{0.6}Ce_{0.25}Yb_{0.15}O_{3-p}$,
19. $BaZr_{0.6}Ce_{0.25}Sc_{0.15}O_{3-p}$,
20. $BaZr_{0.5}Ce_{0.45}Fe_{0.05}O_{3-p}$,
21. $BaZr_{0.5}Ce_{0.45}Co_{0.05}O_{3-p}$,
22. $BaZr_{0.5}Ce_{0.45}Ni_{0.05}O_{3-p}$, and
23. $BaZr_{0.5}Ce_{0.45}Al_{0.05}O_{3-p}$.

These sintered products were subjected to a heat resistance test of repeated heat cycles from room temperature to 1000° C. The sintered products with 1 $\mu$m to 30 $\mu$m granular diameter showed no cracks or fractures even after repeating the heat cycle 100 times. On the other hand, almost none of the sintered products with more than 30 $\mu$m granular diameter could withstand 100 heat cycles.

Thus it could be confirmed that ion conductors of perovskite oxides with the composition $BaZr_{1-x}M_xO_{3-p}$ and perovskite oxides with the composition $BaZr_{1-x-y}Ce_xM_yO_{3-p}$, having a sintered product granular diameter of at least 1 $\mu$m and at most 30 $\mu$m have excellent thermal shock resistance and high reliability.

The present invention is not limited to the compositions in the above embodiments. For example, as long as the object of the present invention is attained, the element M can also be a trivalent metal besides those mentioned above. Also, the ion conductor can also fulfill a plurality of the conditions with regard to crystal system, lattice constants, density and granular diameter set forth in the second to fourth embodiments.

The following is an explanation of an example of an electrochemical device using an ion conductor of the present invention.

Figure 2:
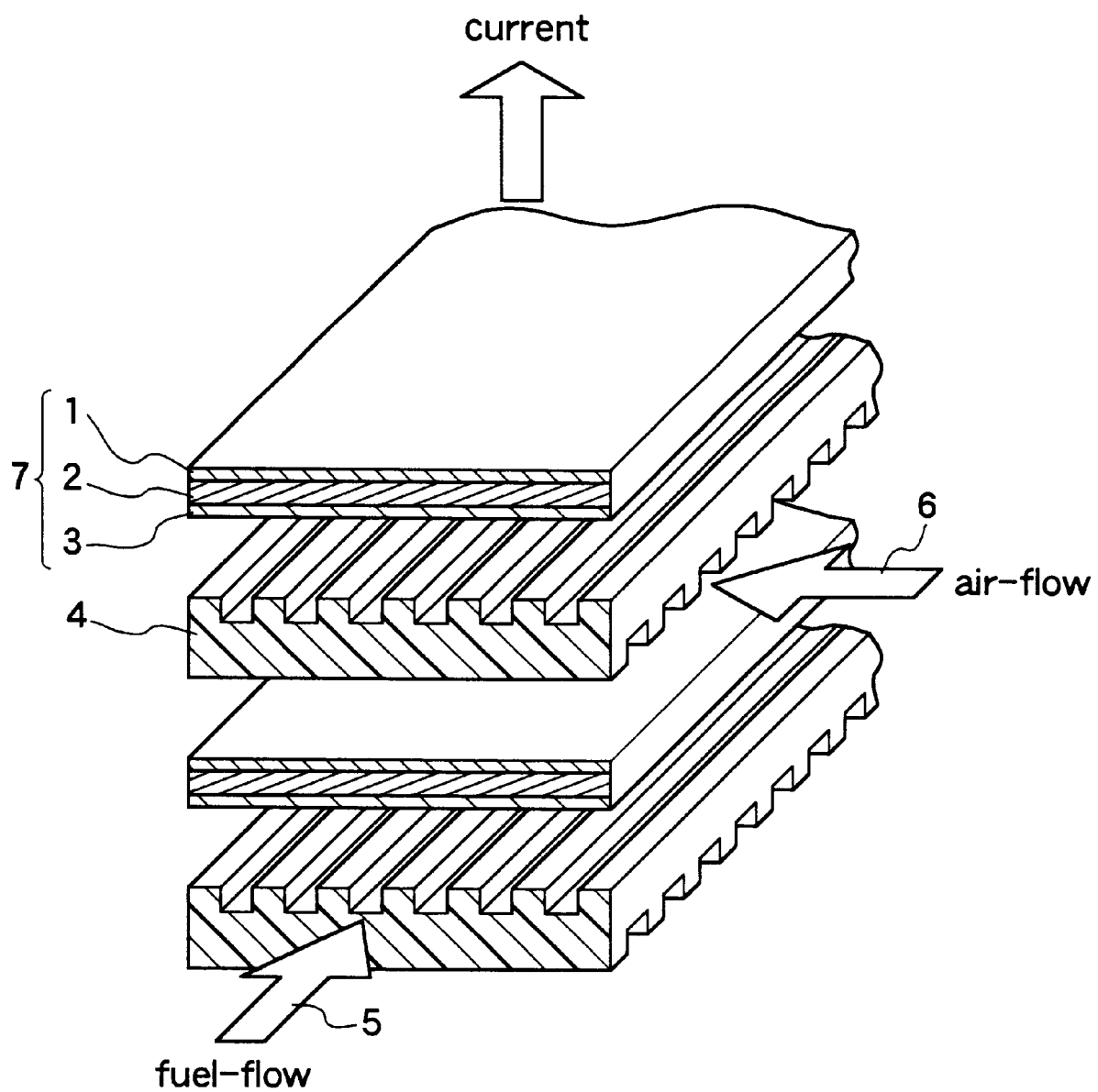
FIG. 2 is a perspective view of an embodiment of a fuel cell, which is an electrochemical device, in accordance with the present invention.

FIG. 2 is a perspective view of an embodiment of a fuel cell in accordance with the present invention. This plate-shaped fuel cell is made of layered units 7 including a cathode (air electrode) 1, an anode (fuel electrode) 3 and a solid electrolyte disposed between cathode 1 and anode 3. Separators 4 are arranged between the layered units 7.

When producing electric power, an oxidation gas 6 (such as air) is supplied to the anode 1, and a fuel gas 5 (reduction gas such as hydrogen or natural gas) is supplied to the anode 3. Electrons generated in a redox reaction at the electrodes are then taken to the outside.

Figure 3:
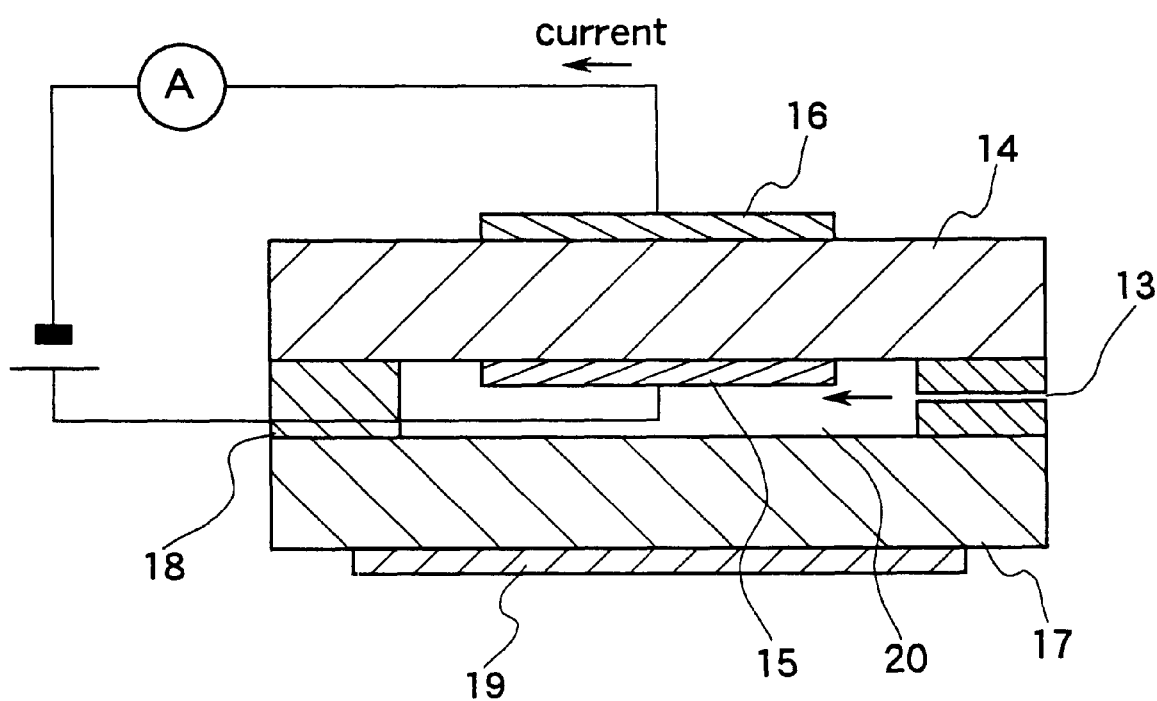
FIG. 3 is a cross-sectional view of an embodiment of a gas sensor, which is another electrochemical device, in accordance with the present invention.

FIG. 3 is a cross-sectional view of an embodiment of a gas sensor in accordance with the present invention. In this HC sensor (hydrocarbon sensor), an anode 15 and a cathode 16 are separated by a solid electrolyte 14. This layered product is fixed with an inorganic adhesive 18 on a substrate (ceramic substrate) 17, such that a space 20 is maintained between the layered product and the substrate 17. A diffusion control hole 13 connects this inner space 20 to the outside.

When a predetermined voltage (for example 1.2 V) is applied steadily between the electrodes 15 and 16 of this sensor, then an output current depending on the density of hydrocarbons in the space contacting the anode 15 can be obtained. During the measurement, the sensor is kept at a predetermined temperature with a heater 19 attached to the substrate. The diffusion control hole 13 controls the amount of the substance to be measured (such as hydrocarbons) flowing into the inner space 20.

The above explanations related to a HC sensor, but the same configuration shown in FIG. 3 can also be used as an oxygen sensor when switching anode and cathode. Furthermore, the ion conductor of the present invention is not limited to the above, but can be used for a variety of electrochemical devices.

Thus, as explained above, the invention presents ion conductors with high reliability and excellent thermal shock resistance and moisture resistance. These ion conductors can contribute to a higher reliability of electrochemical devices.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An ion conductor that is a perovskite oxide having the composition $BaZr_{1-x}Ce_xO_{3-p}$, wherein x is larger than zero but not larger than 0.8, and p is larger than zero but smaller than 1.5.

2. An electrochemical device comprising an ion conductor according to claim 1 as a solid electrolyte.

3. An ion conductor that is a perovskite oxide essentially consisting of Ba, Zr, Ce and O, and substantially conducting protons only.

4. An electrochemical device comprising an ion conductor according to claim 3 as a solid electrolyte.

5. An ion conductor that is a perovskite oxide having the composition $BaZr_{1-x-y}Ce_xM_yO_{3-p}$, wherein M is a trivalent substituent element, x is greater than or equal to zero but smaller than 1, y is larger than zero but smaller than 1, x+y is larger than zero but smaller than 1, and p is larger than zero but smaller than 1.5, wherein the ion conductor is a substantially single-phase polycrystal of cubic, tetragonal or orthorhombic crystal system whose unit cell axes a, b and c (with $a \geq b \geq c$) satisfy 0.8386 nm $<a<$0.8916 nm and $b/a \geq 0.90$.

6. The ion conductor according to claim 5, wherein $b/a \geq 0.90$ and $c/a \geq 0.90$.

7. The ion conductor according to claim 5, wherein x is zero.

8. The ion conductor according to claim 5, wherein x is larger than zero.

9. The ion conductor according to claim 5, wherein M is at least one element selected from the group consisting of La, Pr, Nd, Pm, Sm, Eu, Gd, Tb, Dy, Ho, Er, Tm, Yb, Y. Sc, Mn, Fe, Co, Ni, Al, Ga and In.

10. An electrochemical device comprising an ion conductor according to claim 5 as a solid electrolyte.

11. An ion conductor that is a perovskite oxide having the composition $BaZr_{1-x-y}Ce_xM_yO_{3-p}$, wherein M is a trivalent substituent element, x is greater than or equal to zero but smaller than 1, y is larger than zero but smaller than 1, x+y is larger than zero but smaller than 1, and p is larger than zero but smaller than 1.5, wherein the ion conductor is a substantially single-phase sintered product with a density of at least 96% of the theoretical density.

12. The ion conductor according to claim 11, wherein x is zero.

13. The ion conductor according to claim 11, wherein x is larger than zero.

14. The ion conductor according to claim 11, wherein M is at least one element selected from the group consisting of La, Pr, Nd, Pm, Sm, Eu, Gd, Tb, Dy, Ho, Er, Tm, Yb, Y, Sc, Mn, Fe, Co, Ni, Al, Ga and In.

15. An electrochemical device comprising an ion conductor according to claim 11 as a solid elect rolyte.

16. An ion conductor that is a perovskite oxide having the composition $BaZr_{1-x-y}Ce_xM_yO_{3-p}$, wherein M is a trivalent substituent element, x is greater than or equal to zero but smaller than 1, y is larger than zero but smaller than 1, x+y is larger than zero but smaller than 1, and p is larger than zero but smaller than 1.5, wherein the ion conductor is a substantially single-phase sintered product with granular diameter of at least 1 $\mu$m and not more than 30 $\mu$m.

17. The ion conductor according to claim 16, wherein x is zero.

18. The ion conductor according to claim 16, wherein x is larger than zero.

19. The ion conductor according to claim 16, wherein M is at least one element selected from the group consisting of La, Pr, Nd, Pm, Sm, Eu, Gd, Tb, Dy, Ho, Er, Tm, Yb, N, Sc, Mn, Fe, Co, Ni, Al, Ga and In.

20. An electrochemical device comprising an ion conductor according to claim 16 as a solid electrolyte.

* * * * *

UNITED STATES PATENT AND TRADEMARK OFFICE
CERTIFICATE OF CORRECTION

PATENT NO. : 6,517,693 B2
DATED : February 11, 2003
INVENTOR(S) : Taniguchi

It is certified that error appears in the above-identified patent and that said Letters Patent is hereby corrected as shown below:

<u>Title page,</u>
Item [56], References Cited, OTHER PUBLICATIONS, in "Jose" publication "superconducto." should read -- superconductors. --

<u>Column 9,</u>
Line 20, "band c" should read -- b and c --

<u>Column 10,</u>
Line 16, "elect rolyte." should read -- electrolyte. --
Line 31, "Yb, N, Sc," should read -- Tb, Y, Sc, --

Signed and Sealed this

Thirteenth Day of January, 2004

JON W. DUDAS
*Acting Director of the United States Patent and Trademark Office*